United States Patent
Izelfanane

(10) Patent No.: US 7,527,032 B2
(45) Date of Patent: May 5, 2009

(54) METHOD FOR CONTROLLING THE OPERATION OF A CYLINDER FOR AN INTERNAL COMBUSTION ENGINE

(75) Inventor: Said Izelfanane, Houilles (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 0 days.

(21) Appl. No.: 11/568,450

(22) PCT Filed: Apr. 8, 2005

(86) PCT No.: PCT/FR2005/050226

§ 371 (c)(1),
(2), (4) Date: Oct. 27, 2006

(87) PCT Pub. No.: WO2005/113963

PCT Pub. Date: Dec. 1, 2005

(65) Prior Publication Data

US 2007/0168108 A1    Jul. 19, 2007

(30) Foreign Application Priority Data

Apr. 29, 2004 (FR) .................................. 04 50830

(51) Int. Cl.
*G06F 19/00* (2006.01)
*F01L 1/34* (2006.01)
*F02D 17/02* (2006.01)
*F02D 13/06* (2006.01)

(52) U.S. Cl. ................ 123/198 F; 123/90.16; 701/112; 701/103

(58) Field of Classification Search ......... 123/198 F, 123/481, 90.16; 701/112, 103
See application file for complete search history.

(56) References Cited

U.S. PATENT DOCUMENTS

| 5,408,966 A | * | 4/1995 | Lipinski et al. ........... 123/198 F |
| 5,642,703 A | | 7/1997 | Stockhausen et al. |
| 5,803,040 A | | 9/1998 | Lautenschuetz et al. |
| 6,161,521 A | | 12/2000 | Russ et al. |

FOREIGN PATENT DOCUMENTS

| EP | 0659993 A | 6/1995 |
| FR | 2837871 A | 10/2003 |

OTHER PUBLICATIONS

International Search Report (ISR) mailed Nov. 28, 2005 in PCT/FR2005/050226.

* cited by examiner

*Primary Examiner*—Michael Cuff
*Assistant Examiner*—Hyder Ali
(74) *Attorney, Agent, or Firm*—Nicolas E. Seckel

(57) ABSTRACT

The invention relates to a method for controlling the operation of a cylinder for a multi-cylinder four-stroke internal combustion engine, wherein said cylinder interacts with at least one fuel injector, an intake valve, an exhaust valve, operation members for controlling the opening of the valves according to a cycle running and means driven by an engine control computer according to the predetermined operation conditions of the engine for selectively opening or closing said cylinder valves, wherein the deactivation of the valves is carried out simultaneously in the middle of a cycle at a time approximately coinciding with the middle of a time extending between the theoretical consecutive opening times of the intake (OI) and the exhaust (OE) valves.

14 Claims, 2 Drawing Sheets

METHOD FOR CONTROLLING THE OPERATION OF A CYLINDER FOR AN INTERNAL COMBUSTION ENGINE

The present invention concerns a method and a device for controlling the operation of a cylinder of an internal combustion engine. The present invention concerns more particularly the deactivation or activation of valves of a cylinder of an engine.

Internal combustion engines, and in particular engines that equip motor vehicles or trucks are most often solicited only to a fraction of their nominal power. During these phases of operation that do not require delivery of a high torque, the engines face losses due to pumping, which affect their efficiency and are at the source of an excessive fuel consumption. These pumping losses correspond to the work that must be provided to suck the air/fuel mixture which is located in the intake collector at a relatively low pressure and introduce it into the combustion chamber during the intake phase.

To reduce these pumping losses, it is known to deactivate a part of these cylinders. The deactivated cylinders have their intake and exhaust valves closed and are thus no longer crossed by a gas flow. These deactivated cylinders generate practically no losses because they operate then like air springs, which alternate compression and decompression phases of the air trapped in these cylinders. Regarding the cylinders which have remained active, they must produce a higher torque, and thus, they require a higher flow of intake air in the collector, which increases the pressure in the collector, and thus reduces the pumping losses of the engine.

The deactivation is conventionally performed by an appropriate mechanism that acts on the distribution to the cylinders according to the operating conditions of the engine.

Thus, in the case of a distribution via camshaft and pawls, it is known to act on the hydraulic valve lifters or hydraulic tappets on which extremities of the pawls are supported. The patent FR2837871 illustrates such a device.

A goal of the present invention is to improve further the benefit of cylinder deactivation on the efficiency of engines by proposing an improved method and an improved device for the deactivation or activation of the valves.

The method according to the invention concerns controlling the operation of an internal combustion engine of the four-stroke, multicylinder type, said cylinder cooperating with at least one fuel injector, an intake valve, an exhaust valve, operation members to control the opening of the valves according to the development of the cycle, and means driven by an engine control computer according to predetermined operation conditions of said engine to selectively activate or deactivate said valves of said cylinder.

According to the invention, this method is characterized in that the deactivation of the valves is performed simultaneously, and in that the deactivation of said valves is performed during the course of a cycle, at a time coinciding substantially with the middle of a time period extending between the theoretical consecutive opening time of the intake valve and opening time of the exhaust valve.

According to another characteristic of the method according to the invention, the reactivation of the valves is performed simultaneously, and the reactivation of the valves is performed during the course of a cycle, at a time coinciding substantially with the middle of the period extending between the theoretical consecutive opening time of the intake valve and opening time of the exhaust valve.

According to another characteristic of the method according to the invention, there are two cylinders of said internal combustion engine of the four-stroke, multicylinder type whose operation is controlled; the deactivation or activation of the valves of each of these two cylinders is then performed sequentially, one cylinder after the other, while respecting the theoretical ignition order of said cylinders.

According to another characteristic of the method according to the invention, the driven means exhibit a delay between their control by the computer and the actual activation or deactivation of the valves, and this delay is taken into account to operate the control of said means.

According to another characteristic of the method according to the invention, the value of the delay is mapped as a function of the operation point of the engine, as well as of the aging of said engine.

According to another characteristic of the method according to the invention, an error value is determined on the measurement of the delay, said error value being preferably mapped as a function of the operating point of the engine, as well as of the aging of said engine.

According to another characteristic of the method according to the invention, the deactivation of the valves of the cylinder is controlled only if the error value is lower than half the time interval separating the theoretical opening time of the intake valve and the theoretical opening time of the exhaust valve.

The present invention also concerns a device for implementing the method according to the invention.

According to another characteristic of the device according to the invention, the engine control computer comprises an appropriate program, this program being adapted to perform the control of the activation or deactivation means of the cylinder so that the activation or deactivation of the valves of the cylinder is performed, during the course of the cycle, substantially in the middle of the period extending between the theoretical opening time of the intake valve (OI) and the theoretical opening time of the exhaust valve (OE).

According to another characteristic of the device according to the invention, the driven means comprise disengageable hydraulic tappets interposed between said valves and said control members and a hydraulic circuit controlled by an electrovalve controlled by the engine control computer.

According to another characteristic of the device according to the invention, the driven means comprise electromechanical actuators controlling the opening of the valves.

The present invention and its advantages will be better understood by studying the following detailed description of an exemplary, non-limitative embodiment as illustrated in the annexed drawings, in which.

Figure 1:
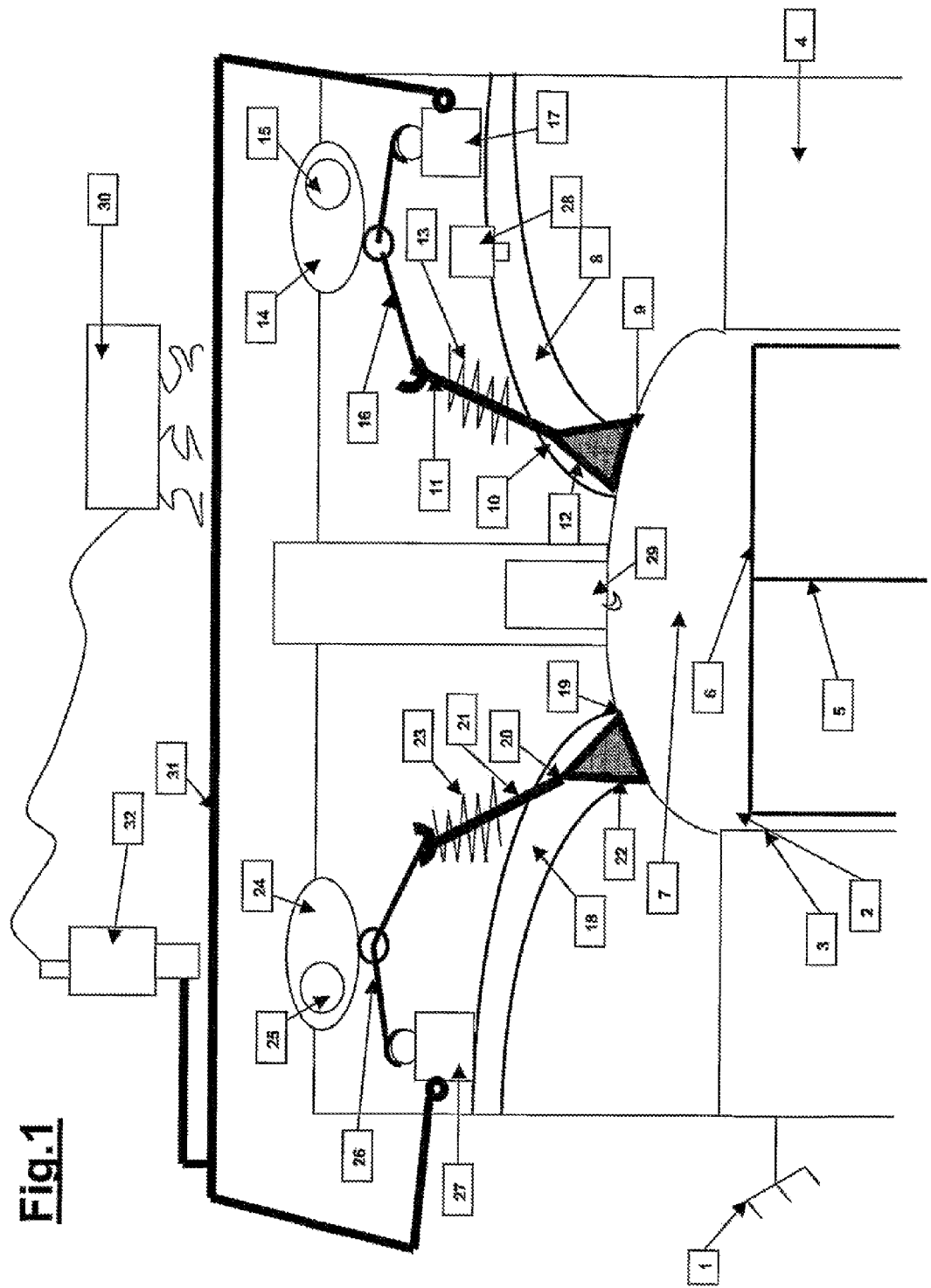
FIG. 1 is a schematic and partial cross-section view of a combustion engine for implementing the method according to the invention.

Referring to FIG. 1, this figure shows a four-stroke, controlled ignition engine, identified by 1, which is intended in particular to equip a motor vehicle. This engine 1, which implements the method for cylinder disconnection according to the present invention, comprises classically four cylinder in line, identified by C1, C2, C3, and C4 respectively. Only cylinder C2 has been shown in detail.

The cylinder C2 has a bore 3 provided in a cylinder casing block 2. This bore 3 is closed at its upper extremity by a cylinder head 4 disposed on top of the said casing block 2. A piston 5 is slidingly mounted in the bore 3 of the cylinder 2. This piston is connected via a connecting rod, not shown, to a crankshaft, also not shown. The upper surface 6 of the piston 5, the upper portion of the bore 3, and the facing lower surface of the cylinder head 4, define the combustion chamber 7.

The cylinder head 4 comprises an intake circuit for intake gas formed by at least one conduit 8. This conduit 8 opens into the roof of the chamber 7 by an opening 9 cooperating with a control valve 10 adapted to be actuated between a closed position for closing the opening 9 and an opened position for gas intake. The valve 10 comprises a control rod 11 and a closing head 12 having a frustoconical shape, whose inclined peripheral surface comes in contact with a corresponding surface of the opening 9 forming a valve seat to close the opening 9.

The opening of the valve 10 is performed against the valve spring 13 by a cam 14 carried by a camshaft 15 via a pivoting lever 16 also called pawl. This pawl is supported, on the one hand, on the extremity of the valve rod 11, and on the other hand, on a hydraulic valve lifter or tappet 17. The tappet 17 is normally used as pivoting point for the pawl and for play compensation.

The cylinder head 4 also comprises an exhaust circuit for burned gases formed by at least one exhaust conduit 18 opening into the roof of the chamber 7 via an opening 19 adapted to be closed by a control valve 20 comprising an actuating rod 21 and a closing head 22.

In a manner similar to the intake, the opening of the valve 20 is performed against the valve spring 23 by a cam 24 carried by a camshaft 25 via a pawl 26. This pawl is supported, on the one hand, on the extremity of the valve rod 21, and on the other hand, on a hydraulic valve lifter or tappet 27 similar to the tappet 17.

The cylinder head 4 comprises a means for injecting fuel formed by a driven injector 28 receiving, at an outside inlet, the fuel at an adequate pressure, and having an extremity forming the injection nozzle, which opens into the intake circuit of the cylinder C2, upstream of the valve 10. The cylinder head 4 also comprises a spark plug 29.

The control of the injector 28, regarding the injection time and regarding the amount of injected fuel, is performed by an engine control computer 30 from appropriate data such as the speed of the engine, the load and the position of the piston 5 in the cylinder 3 provided by a crankshaft position sensor, not shown.

The computer 30 also controls the ignition time of the spark plug 29 according to the operating point of the engine.

Classically, the order of injection and ignition of the cylinders is as follows: C1, C3, C4, and C2. This ignition order, which is the order in which the cylinder are ignited successively, aims at favoring the balancing of the mobile equipment, not shown, comprised of the crankshaft, the connecting rods, and the pistons.

According to the invention, the engine 1 is equipped with a mechanism for the disconnection of the cylinders intended to reduce pumping losses during some operation phases, and in particular during operation with partial load.

An aim of this disconnection mechanism, also driven by the engine control computer 30, is, when the engine operates within predetermined conditions, to disconnect (i.e., to not let operate) two cylinders out of four, and thus, to let the engine operate with only two cylinders. The disconnection of the cylinders is performed by the deactivation of the gas intake and exhaust valves.

To reduce the problems of dilatation of the cylinder head and engine block due to the cooling effect generated by the operation reduced to two cylinders, cylinders C3 and C2 are deactivated, whereas the cylinders at the extremities, C1 and C4, remain active. This mechanism operates naturally the reconnection of the deactivated cylinders at the time as soon as the operation of the engine leaves the predetermined operation phases mentioned above.

In the following description, a disconnection strategy will be described where the disconnection of cylinder C3, then of cylinder C2, are performed successively. This strategy is not limitative regarding the present invention, it can also be arranged that cylinder C2 is disconnected after cylinder C3, after a predetermined time period.

The disconnection mechanism illustrated as a non-limitative example uses hydraulic tappets 17 and 27 adapted to be able to be disengaged, and thus, to deactivate the valves, i.e., to immobilize the latter on their seats in closed position, and this, for any position of the camshaft.

This type of disengageable hydraulic tappets operate according to two modes: a first mode where the tappet is locked in position in the cylinder head 4 and serves then as a tipping point for the corresponding pawl, and a second mode where the tappet is mobile in its housing and where the tipping point of the pawl under the action of the associated cam becomes the extremity of the valve rod, the valve remaining then immobile on its seat.

The locking and unlocking operations on the tappets 17 and 27 are, according to the illustrated exemplary embodiment, performed via a same pressurized hydraulic circuit 31 controlled by a driven electrovalve 32. Classically, when the valve associated to one or the other of the tappets 17, 27 is in opening phase, the unlocking control of the corresponding tappet is then inactive, the unlocking of a tappet is performed only when the associated valve is placed on its seat.

Such tappets are known in themselves and will not be described more in details. One can refer, for example, to document FR2837871 which describes an embodiment of such disengageable tappets.

According to an embodiment of the illustrated deactivation device, the deactivation of the intake and exhaust valves of the cylinder C2 is thus performed simultaneously by a hydraulic circuit 31 controlled by a first driven electrovalve 32, also called EV2, whereas the deactivation of the intake and exhaust valves of the cylinder C3, not shown, is performed by another hydraulic circuit distinct from the first, and controlled by a second driven electrovalve EV3.

Figure 2:
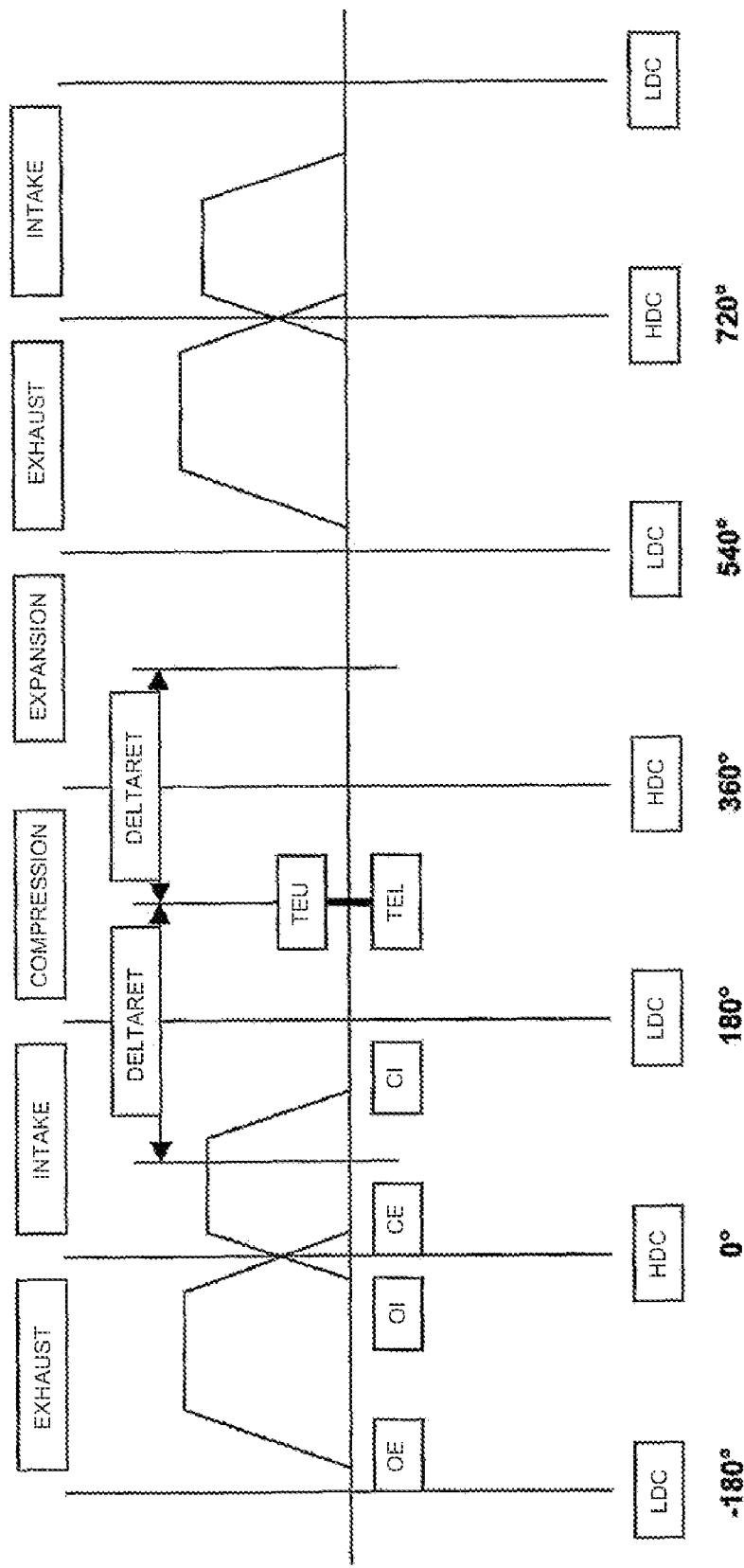
FIG. 2 is a chronogram detailing the method according to the invention.

Referring to FIG. 2, this figure shows the chronogram of the method for controlling the valves of cylinder C2, which is useful for understanding the deactivation method according to the invention. Since the process for disconnecting cylinder C3 is identical to that of cylinder C2, only the disconnection of cylinder C2 will be described in details below.

The chronogram describes the control of the valves when they are in service during the course of the engine cycle in the cylinder C2, half-revolution of the crankshaft after half-revolution of the crankshaft. A cycle extends over two revolutions of the crankshaft, i.e., 720° crankshaft. For ease of reference, all times will be identified in the form of a value of crankshaft angle.

Shortly before the high dead center HDC (0°) which initiates a new four-stroke cycle, the intake valve 10 opens at time OI, whereas the exhaust valve 20 is itself still open. Shortly after this crossing HDC, the exhaust valve closes at time CE, and, the intake valve being open, the piston going down can suck in fresh gases. This first "intake" period lasts practically until after the low dead center LDC (180°) where the closing of the intake valve 10 is performed at time CI.

The two following time periods, called "compression" and "combustion/expansion," respectively, then come after the "intake" period. The "compression" period accompanies the piston going up to the ignition HDC (360°) whereas the "expansion" period, the driving period of the cycle, corresponds to the piston going down to the LDC (540°).

In the vicinity of the low dead center LDC (540°), the exhaust valve opens at time OE. During the "exhaust" period, the piston 5 going up to the HDC (720°) ensure the quasi-complete elimination of the combustion gases from the combustion chamber 7. Then, the cycle restarts with a new "intake" phase, etc.

In the case where the engine is equipped with a variable distribution system with phase shifter or other mechanism that makes it possible to vary the rising times, then the times OE, CE, OI, CI vary as a function of the operating conditions of the engine 1 and in particular the speed and load conditions, and this, just like the ignition time IG of the spark plug 29 which takes place in the vicinity of the HDC, toward the end of the compression period.

In accordance with the invention, the method of deactivation of the valves is adapted to implement the trapping of burned gases in the chamber 7 when the cylinder C2 is located at the LDC. To this effect, the disengagement of the tappets 17 and 27 must be performed before the "exhaust" phase of a running cycle, i.e., after the start of the intake phase OI of the fuel mixture and before the start OE of the opening of the exhaust valves.

Indeed, the applicant has shown that the presence of hot burned gases in the disconnected cylinders makes it possible to reduce considerably the acyclism of the engine, and this, with respect to disconnected cylinders filled with fresh air or empty.

In accordance with the invention, the time of theoretical effective unlocking TEU of the tappets 17 and 27 is thus determined as being substantially in the middle of the interval separating the theoretical consecutive times OI and OE corresponding to the operating point under consideration, as follows: (OI-OA)/2, i.e., substantially in the middle of the compression period, i.e., also, in the vicinity of 270° crankshaft angle. If we consider a time OI with an advance in the order of 20° and a time OE with an advance of 60° with respect to the high dead center and to the low dead center, respectively, then the theoretical effective unlocking time is equal to 250°.

Taking into account the response time RET of the hydraulic circuit 31 and of the valve EV2, the computer 30 must anticipate the instant TEU and trigger the control of the valve EV2 at a time T such that T+RET is equal to TEU.

The response time RET of the hydraulic circuit 31 and of the valve EV2 is mapped according to the operating conditions of the engine, and in particular the pressure and engine speed parameters, as well as, in particular, the aging of the parts of the hydraulic circuit.

Taking into account the manufacturing tolerances and the aging of the parts, the determination of the time RET comprises a tolerance, which tolerance can itself be estimated by a value DeltaRET. Thus, when the computer triggers the unlocking at time T (TEU–RET), the actual effective unlocking takes place within the time period: (TEU–DeltaRET; TEU+DeltaRET).

Taking into account the discussion above, i.e., that the actual effective unlocking takes place within the time period [OI; OE], it is thus important that the hydraulic circuit be dimensioned to respond to a DeltaRET well below 270° crankshaft angle, which, for example, at an engine speed of 3,000 revs/min, corresponds to 15 ms, and to 30 ms at 1,500 revs/min. Conversely, if it is not possible to maintain in all the disconnection phases a value of DeltaRET well below 270° crankshaft angle, then the disconnection is no longer performed in the initial phases, but only in those that make it possible to guarantee a value DeltaRET below 270°.

The mapping used by the engine control computer 30 thus takes into account all these different values to perform the control of the deactivation of the cylinder C2.

The management of the reactivation of the valves is substantially similar. Indeed, it is appropriate to proceed first to the evacuation of the burned gases before admitting again a fuel mixture or air, and this, so as not to evacuate too much burned gases during intake. To this effect, the exhaust must be opened before the intake.

In accordance with the invention, the theoretical effective locking time TEL of the tappets 17 and 27 is thus determined as being substantially in the middle of the interval separating the times OI and OE, i.e., substantially in the middle of the compression period, i.e., also, in the vicinity of 270° crankshaft angle.

The reactivation of the valves is thus driven by the engine control computer in the same way as the deactivation of these valves. What has been described above regarding the driven electrovalve applies in a perfectly similar manner and will not be detailed further. However, it must be noted that it will be advisable to take into account a delay value specific to the reactivation, distinct from the value corresponding to the deactivation.

Of course, the present invention is not limited to the embodiment just described, and it is possible to provide many changes and modifications without leaving the scope of the present invention.

Thus, the present invention also applies to engines having electromagnetic distributions. In that case, the actuators controlling the valves are controlled so as to deactivate the valves of the cylinders to be deactivated.

Thus, the present invention applies for any number of cylinders in the engine (four, five, six, seven, eight, etc.) and for any number of cylinders to be disconnected (one, two, three, four, etc.)

The invention claimed is:

1. Method for controlling the operation of a cylinder of an internal combustion engine of the four-stroke, multi-cylinder type, said cylinder cooperating with at least one fuel injector, an intake valve, an exhaust valve, operating members for controlling the opening of the valves according to the course of the cycle, and means driven by an engine control computer according to predetermined operating conditions of said engine to deactivate or activate selectively said valves of said cylinder, wherein the deactivation of said valves is performed simultaneously, and the deactivation of said valves is performed in the course of a cycle, at a time coinciding substantially with the middle of the period extending between the computer-calculated consecutive opening time of the intake valve (OI) and opening time of the exhaust valve (OE),
   wherein said driven means have a delay between their control by said computer and the actual activation or deactivation of said valves, and this delay is taken into account to perform the control of said means, and
   wherein an error value is determined on the measurement of said delay.

2. Method for controlling according to claim 1, wherein the reactivation of said valves is performed simultaneously, and the reactivation of said valves is performed in the course of a cycle, at a time coinciding substantially with the middle of the period extending between the computer-calculated consecutive opening time of the intake valve (OI) and opening time of the exhaust valve (OE).

3. Method according to claim 1, wherein there are two cylinders of said internal combustion engine of the four-stroke, multi-cylinder type, whose operation is controlled, and the deactivation or activation of the valves of each of the two cylinders is performed sequentially, one cylinder after the other, while respecting the computer-calculated ignition order of said cylinders.

4. Method according to claim 1, wherein the value of said delay is mapped as a function of the operating point of the engine, as well as of the aging of said engine.

5. Method according to claim 1, wherein the deactivation of said valves of said cylinder is controlled only if the error value is below half the time interval separating the computer-calculated opening time of the intake valve (OI) and the computer-calculated opening time of the exhaust valve (OE).

6. Method according to claim 1, wherein said driven means comprise disengageable hydraulic tappets interposed between said valves and said control members and a hydraulic circuit controlled by an electrovalve controlled by the engine control computer.

7. Method according to claim 1, wherein said driven means comprise electromechanical actuators controlling the opening of the valves.

8. Device for implementing the method according to claim 1, wherein said engine control computer comprises an appropriate program, said program being adapted to perform the control of said means for the activation or deactivation of the valves of said cylinder so that the deactivation or the activation of the valves of said cylinder takes place, in the course of the cycle, substantially in the middle of a period extending between the computer-calculated opening time of the opening valve (OI) and the computer-calculated opening time of the exhaust valve (OE), wherein said driven means have a delay between their control by said computer and the actual activation or deactivation of said valves, and this delay is taken into account to perform the control of said means, and wherein an error value is determined on the measurement of said delay.

9. Device according to claim 8, wherein said driven means comprise disengageable hydraulic tappets interposed between said valves and said control members and a hydraulic circuit controlled by an electrovalve controlled by the engine control computer.

10. Device according to claim 8, wherein said driven means comprise electromechanical actuators controlling the opening of the valves.

11. Device according to claim 8, wherein the reactivation of said valves is performed simultaneously, and the reactivation of said valves is performed in the course of a cycle, at a time coinciding substantially with the middle of the period extending between the computer-calculated consecutive opening time of the intake valve (OI) and opening time of the exhaust valve (OE).

12. Device according to claim 8, wherein there are two cylinders of said internal combustion engine of the four-stroke, multi-cylinder type, whose operation is controlled, and the deactivation or activation of the valves of each of the two cylinders is performed sequentially, one cylinder after the other, while respecting the computer-calculated ignition order of said cylinders.

13. Device according to claim 8, wherein the value of said delay is mapped as a function of the operating point of the engine, as well as of the aging of said engine.

14. Device according to claim 8, wherein the deactivation of said valves of said cylinder is controlled only if the error value is below half the time interval separating the computer-calculated opening time of the intake valve (OI) and the computer-calculated opening time of the exhaust valve (OE).

* * * * *